US008860772B2

(12) United States Patent
Yamada

(10) Patent No.: US 8,860,772 B2
(45) Date of Patent: Oct. 14, 2014

(54) DIGITAL BROADCAST RECEIVER

(75) Inventor: Yoshito Yamada, Ageo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 13/275,015

(22) Filed: Oct. 17, 2011

(65) Prior Publication Data

US 2012/0194633 A1    Aug. 2, 2012

(30) Foreign Application Priority Data

Jan. 31, 2011  (JP) ................................. 2011-019240

(51) Int. Cl.
*H04N 7/14* (2006.01)
*H04N 21/478* (2011.01)
*H04N 21/4223* (2011.01)

(52) U.S. Cl.
CPC ......... *H04N 21/4223* (2013.01); *H04N 21/478* (2013.01); *H04N 7/147* (2013.01)
USPC .................... 348/14.03; 348/14.04; 455/556.1

(58) Field of Classification Search
CPC ............ G06F 3/0481–3/0484; H04N 1/00281; H04N 1/00283; H04N 1/00291; H04N 1/00297; H04N 1/00299–1/00318; H04N 1/0035–1/00474; H04N 1/00493–1/00517; H04N 5/44543; H04N 7/141–7/142; H04N 7/147; H04N 7/17318; H04N 21/40; H04N 21/41; H04N 21/4223; H04N 21/42204; H04N 21/42653; H04N 21/431–21/4335; H04N 21/45–21/4623; H04N 21/478; H04N 21/482–21/4888
USPC .................... 348/14.01–14.16; 370/259–271, 370/351–357; 709/201–207, 217–248; 455/412.1–426.2, 456.1–560, 455/575.1–575.9, 90.1–90.3
See application file for complete search history.

(56) References Cited

U.S. PATENT DOCUMENTS

| | | | | | |
|---|---|---|---|---|---|
| 6,154,203 | A | * | 11/2000 | Yuen et al. ...................... | 725/52 |
| 6,177,931 | B1 | * | 1/2001 | Alexander et al. ............... | 725/52 |
| 6,584,153 | B1 | * | 6/2003 | Comito et al. ............ | 375/240.13 |
| 7,890,973 | B2 | * | 2/2011 | Urabe et al. ..................... | 725/39 |
| 8,001,568 | B2 | * | 8/2011 | Thurston et al. ................. | 725/46 |
| 8,181,218 | B2 | * | 5/2012 | Asmussen ...................... | 725/142 |
| 2003/0041333 | A1 | * | 2/2003 | Allen et al. .................... | 725/106 |

(Continued)

FOREIGN PATENT DOCUMENTS

| | | |
|---|---|---|
| JP | 07-030872 | 1/1995 |
| JP | 07-184174 | 7/1995 |
| JP | 2005-159872 | 6/2005 |

(Continued)

OTHER PUBLICATIONS

Japanese Patent Application No. 2011-019240, Notification of Reasons for Refusal, mailed Dec. 16, 2011, (with English Translation).

*Primary Examiner* — Hemant Patel
(74) *Attorney, Agent, or Firm* — Blakely, Sokoloff, Taylor & Zafman LLP

(57) ABSTRACT

One embodiment provides a digital broadcast receiver, including: a video telephone module connected to a communication network; a program table generator configured to generate a program table of broadcast programs; and a display control module configured to display the program table on a screen so as to be superimposed on a video transmitted to the video telephone module at a first predetermined time that comes after the video telephone module has been off-hooked and the video transmitted to the video telephone module has been displayed on the screen.

13 Claims, 10 Drawing Sheets

(56) References Cited

U.S. PATENT DOCUMENTS

| | | |
|---|---|---|
| 2004/0261106 A1* | 12/2004 | Hoffman .................. 725/43 |
| 2006/0020971 A1* | 1/2006 | Poslinski ................. 725/44 |
| 2006/0033808 A1* | 2/2006 | Sakai ..................... 348/14.01 |
| 2007/0040890 A1* | 2/2007 | Morioka et al. ........... 348/14.01 |
| 2008/0026790 A1 | 1/2008 | Nakao et al. |
| 2009/0070815 A1* | 3/2009 | Barrett et al. ............ 725/43 |
| 2010/0073455 A1* | 3/2010 | Iwabuchi et al. .......... 348/14.04 |
| 2010/0192181 A1* | 7/2010 | Friedman ................. 725/44 |

FOREIGN PATENT DOCUMENTS

| | | |
|---|---|---|
| JP | 2006-020286 | 1/2006 |
| JP | 2007-202010 | 8/2007 |
| JP | 2008-160525 | 7/2008 |
| JP | 2010-118801 | 5/2010 |
| WO | 2006-022059 | 3/2006 |

* cited by examiner

DIGITAL BROADCAST RECEIVER

CROSS-REFERENCE TO RELATED APPLICATION(S)

This application claims priority from Japanese Patent Application No. 2011-019240 filed on Jan. 31, 2011, the entire contents of which are incorporated herein by reference.

FIELD

Embodiments described herein relate generally to a digital broadcast receiver.

BACKGROUND

In recent years, video telephone systems which perform a communication using video and audio have been spreading by virtue of the miniaturization of video cameras, the increase of communication speeds, and other factors. As one form of a video telephone system terminal, there is developed a digital broadcast receiver having not only a digital broadcast receiving/reproducing function but also a video telephone function.

In a digital TV receiver imparted with a video telephone function, a broadcast program display picture and a video telephone picture share the screen. Therefore, a video telephone picture may cut into a broadcast program display picture. Specifically, the video telephone picture may cut into part of the broadcast program display picture or replace the video telephone picture totally.

When the video telephone picture replaces the broadcast program display picture totally, the user may be devoted to a TV phone conversation and miss a broadcast program unintentionally. Further, if a TV phone call arrives while the user is viewing a TV program, another program the user wanted to view may start during a TV phone conversation with the partner.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

DETAILED DESCRIPTION

In general, one embodiment provides a digital broadcast receiver, including: a video telephone module connected to a communication network; a program table generator configured to generate a program table of broadcast programs; and a display control module configured to display the program table on a screen so as to be superimposed on a video transmitted to the video telephone module at a first predetermined time that comes after the video telephone module has been off-hooked and the video transmitted to the video telephone module has been displayed on the screen.

Figure 1:
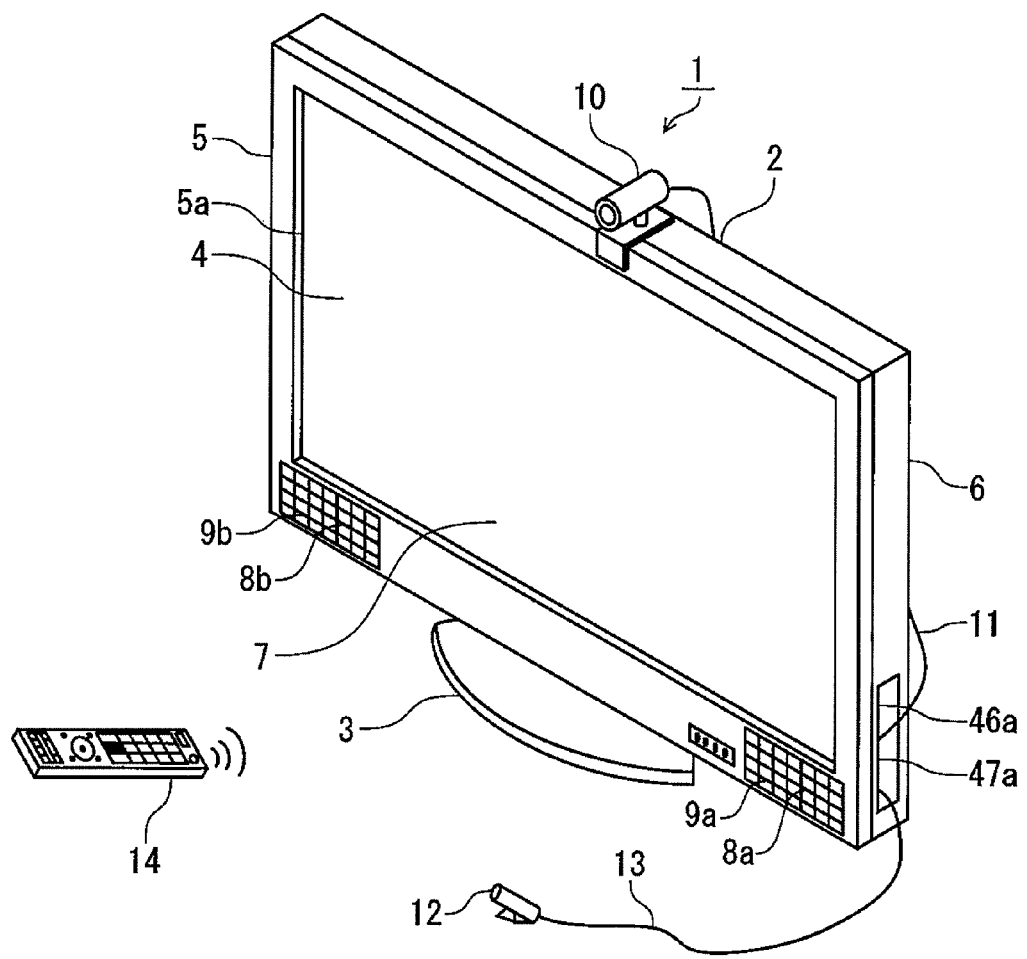
FIG. 1 illustrates a digital broadcast receiver according to an embodiment.

An embodiment will be described with reference to the drawings. FIG. 1 illustrates a digital broadcast receiver 1 according to the embodiment. The digital broadcast receiver 1 is equipped with a cabinet 2 and a stand 3 which supports the cabinet 2. A display panel 4 such as a liquid crystal panel or a PDP (plasma display panel) panel is housed in the cabinet 2 on the front side, and a frame (not shown) which supports the display panel 4 is disposed behind the display panel 4. The frame is provided with a circuit board (not shown) for driving the display panel 4 and a power circuit (not shown).

The cabinet 2 is configured to be enclosed by a front cover 5 which covers the front surface and parts of the top surface, the bottom surface and both side surfaces and a back cover 6 which covers the rear surface and the other parts of the top surface, the bottom surface, and the both side surfaces. A screen 7 is a display portion of the display panel 4 that occupies the inside of a window 5a of the front cover 5.

Speakers 8 are located at a bottom-right portion and a bottom-left portion of the digital broadcast receiver 1 on its front side. A right speaker 8a is disposed inside a net-like cover 9a which occupies a bottom-right portion of the front surface of the front cover 5. A left speaker 8b is disposed inside a net-like cover 9b which occupies a bottom-left portion of the front surface of the front cover 5. The net-like covers 9 may be disposed so as to occupy bottom portions or rear portions of the cabinet 2 depending on an appearance design on the digital broadcast receiver 1. The speakers 8 may be disposed so as to occupy bottom portions or rear portions accordingly and to be directed outward. Net-like covers 9 may be omitted depending on the shapes or installation positions of the speakers 8.

A camera 10 is disposed on top of the digital broadcast receiver 1 on its front side. The camera 10 has a function of taking, mainly, an image of things located in front of the digital broadcast receiver 1 during a TV phone call and sending a resulting video signal to a camera video processor 46 (see FIG. 2) of the digital broadcast receiver 1. The camera 10 is connected by a cable 11 to a camera input terminal 46a which is provided at a side surface of the cabinet 2. The installation position of the camera 10 is not limited to the top-front position, and the camera 10 may be disposed so as to be incorporated in the cabinet 2 of the digital broadcast receiver 1.

A microphone 12 is disposed in front of the digital broadcast receiver 1. The microphone 12 has a function of picking up a sound occurring around the digital broadcast receiver 1 during a TV phone call and sending a resulting audio signal to a microphone audio processor 47 (see FIG. 2) of the digital broadcast receiver 1. The microphone 12 is connected by a cable 13 to a microphone input terminal 47a which is provided at the side surface of the cabinet 2. The installation position of the camera 10 is not limited to the position in front of the digital broadcast receiver 1, and the camera 10 may be disposed so as to be incorporated in the cabinet 2 of the digital broadcast receiver 1. The microphone 12 may be of a wireless type, in which case the digital broadcast receiver 1 requires a receiving device for receiving a wireless signal that is sent from the microphone 12. A wireless microphone 66 (see FIG. 3) which is provided in a remote controller 14 may be used in place of the microphone 12.

The remote controller 14 is a manipulation device for sending a manipulation signal to a manipulation receiver 35 of the digital broadcast receiver 1 by a wireless communication using infrared light, Bluetooth (trademark), etc.

Figure 2:
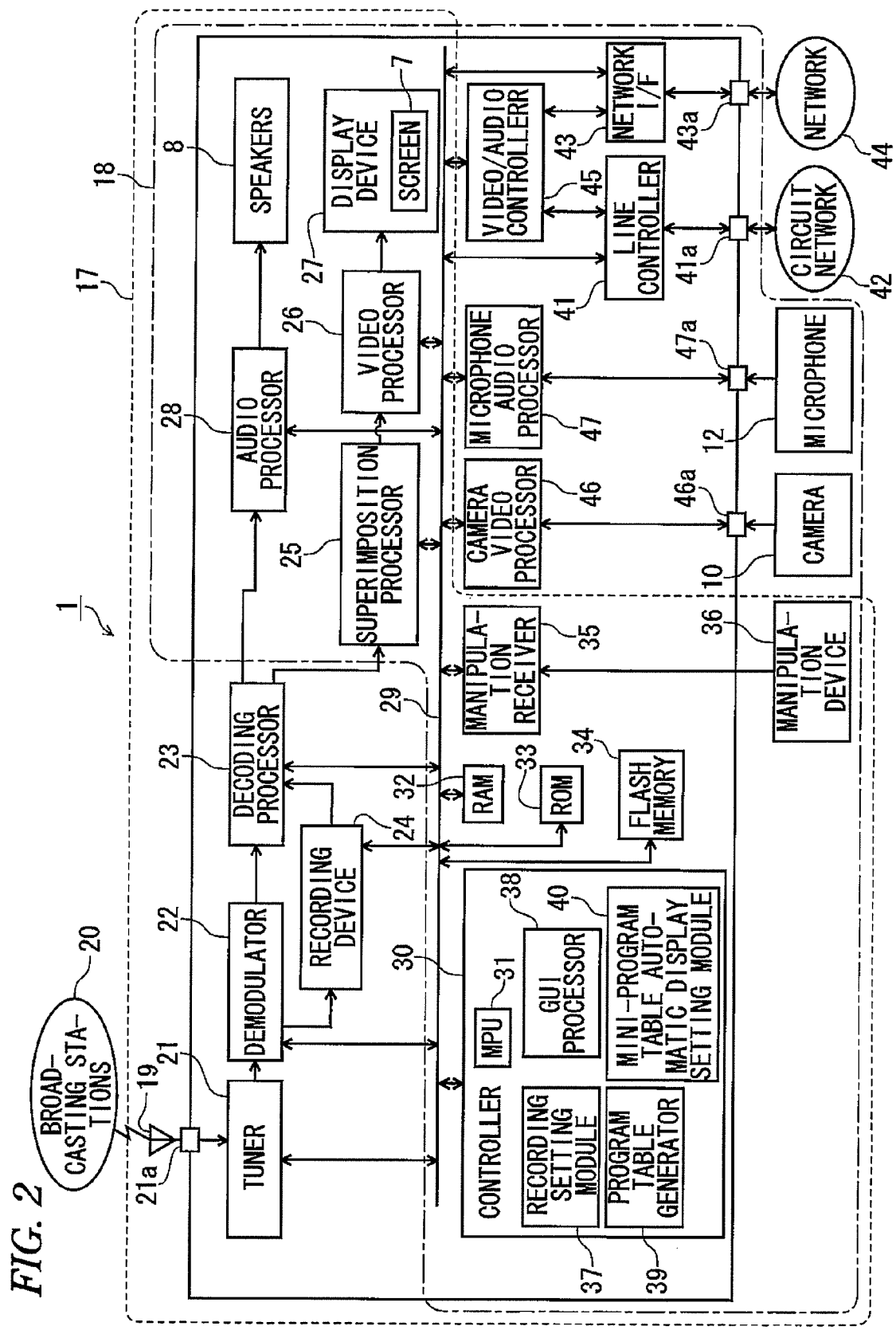
FIG. 2 illustrates configuration of the digital broadcast receiver according to the embodiment.

FIG. 2 illustrates configuration of the digital broadcast receiver 1 according to the embodiment. The digital broadcast receiver 1 functions as both of a broadcast receiver 17 and a video telephone apparatus 18. The broadcast receiver 17 of the digital broadcast receiver 1 can receive a digital broadcast and can display video of a broadcast program on the screen 7 and output a voice through the speakers 8. The video telephone apparatus 18 of the digital broadcast receiver 1 can display video sent from the partner of a TV phone call, converse with the partner while outputting a voice of the partner through the speakers 8, and send an image taken by the camera 10 to a video telephone system of the partner.

The configuration of the broadcast receiver 17 will be described below. An antenna 19 is a ground-wave digital broadcast antenna or a satellite digital broadcast antenna for receiving broadcast waves transmitted from broadcasting stations 20. A tuner 21 tunes in to a broadcast signal(s) on a desired channel(s) from broadcast signals of ground-wave digital broadcasts, satellite digital broadcasts, or cable TV broadcasts. The tuner 21 is composed of plural tuners and hence can tune in to plural broadcasts simultaneously. The antenna 19 is connected to an antenna terminal 21a.

A demodulator 22 performs demodulation according to each digital broadcast modulation method. A ground-wave digital broadcast signal is subjected to OFDM (orthogonal frequency division multiplexing) demodulation, and a satellite digital broadcast signal is subjected to PSK (phase shift keying) demodulation. A resulting demodulated signal, that is, an MPEG (Moving Picture Experts Group) transport stream (TS), is output to a decoding processor 23.

The decoding processor 23 functions as an MPEG decoder, a video/audio decoder, etc. The decoding processor 23 decodes program information data by sectioning MPEG-TS data supplied from the demodulator 22. The decoding processor 23 decodes video data and audio data by converting a video PES (packetized elementary stream) and an audio PES into a video ES (elementary stream) and an audio ES, respectively. The decoding processor 23 also decodes video data and audio data that are input from a recording device 24.

The recording device 24 is a recording module, such as an HDD (hard disk drive), an SSD (solid-state drive), and an ODD (optical disc drive), and is equipped with an encoder and a decoder for recording and reproduction of information. MPEG-TS data is converted via the encoder or decoder into a format that is suitable for a recording/reproduction form and recorded in or reproduced from the recording device 24. Reproduced data is decoded by the decoding processor 23.

Superimposition processor 25 plane-manages video data supplied from the decoding processor 23, data broadcast data transferred from via a bus 29, window drawing data produced by a GUI (graphical user interface) processor 38, and telephone video data supplied from a video/audio controller 45 of the video telephone apparatus 18, performs superimposition on the video data, and supplies resulting data to a video processor 26.

The video processor 26 performs conversion into data having such a format (the number of pixels, frame frequency, and scanning method) as to be displayable by a display device 27, adjusts the display color arbitrarily, and outputs processed data to the display device 27 to cause display of video on the screen 7.

An audio processor 28 converts digital audio data supplied from the decoding processor 23 into analog audio signals that can be reproduced by the speakers 8 or earphones, and outputs resulting data to the speakers 8 or earphones to cause reproduction of a sound. Furthermore, the audio processor 28 outputs audio data supplied from the video/audio controller 45 of the video telephone apparatus 18 to the speakers 8 or earphones to cause reproduction of a voice. The display device 27 and the speakers 8 may be disposed outside the digital broadcast receiver 1 or housed in a cabinet that is separate from the cabinet 2 of the digital broadcast receiver 1.

All operations including the above-described receiving operation of the digital broadcast receiver 1 are supervised by a controller 30. Equipped with an MPU (microprocessing unit) 31, the controller 30 controls the individual components that are connected to it via the bus 29. The controller 30 supervises the components of the video telephone apparatus 18, and controls the operation order of the broadcast receiver 17 and the video telephone apparatus 18, the picture display, the audio output, etc.

A RAM (random access memory) 32 is a read/write memory for storing various data that are necessary for data processing of the controller 30, and serves as a buffer memory for storing video data etc. A ROM (read-only memory) 33 is stored with control programs to be run by the MPU 31 and other information.

A flash memory 34, is a rewritable, nonvolatile semiconductor memory (data stored therein do not disappear even if power supplied it is shut off. The flash memory 34 has a function of storing program information, recorded program information, recording reservation information, etc.

The manipulation receiver 35 receives a manipulation signal from a manipulation device 36 and transfers it to the controller 30. For example, the manipulation receiver 35 is the remote controller 14 which performs a wireless communication using infrared light, Bluetooth (trademark), etc. or a wireless or wired keyboard.

As shown in FIG. 2, the controller 30 functions as a recording setting module 37, the GUI processor 38, and a program table generator 39. These functions are implemented as applications that are executed by the MPU 31 of the controller 30. These applications are stored in the ROM 33 and read and executed by the MPU 31 when used.

The recording setting module 37 sets and manages recording of a broadcast program according to a request from the user. The recording setting module 37 performs processing of recording a reserved program or a program being viewed. Further, the recording setting module 37 manages programs recorded in the recording device 24. The recording setting module 37 manages information of recorded programs by storing, in the flash memory 34 or the recording device 24, program information (broadcasting station name, broadcast date and time, program name, broadcast summary, persons who appear in the program, details of the program, program classification, etc.) of each recorded program, a recording time slot, information indicating whether the recorded program has been reproduced or not, and other information. Still further, the recording setting module 37 generates a list of recorded programs and performs reproduction, deletion, edit, etc. on the recorded programs.

The GUI processor 38 generates GUI (graphical user interface) data and sends the generated GUI data to the superimposition processor 25 via the bus 29. For example, in the superimposition processor 25, the GUI data is superimposed on video data of a broadcast program or a TV phone call or processed to generate a GUI solo picture. Resulting data is supplied to the video processor 26.

The program table generator 39 generates program table data based on EPG data. EPG data containing program information is packetized like video data, audio data, etc. and broadcast in a multiplexed state. Program information data is contained in EIT (event information table) of SI (service information, program arrangement information) and includes information relating to each information such as a broadcasting station name, a broadcast date and time, a program name, a broadcast summary, persons who appear in the program, and details of the program. Program table data is supplied from the program table generator 39 to the GUI processor 38 and used there for generation of a program table, which is supplied to the superimposition processor 25.

The program table display form depends on the broadcast receiver maker and the type of broadcast receiver. In the digital broadcast receiver 1, a program table is displayed such that a channel axis extends in the horizontal direction of the screen 7 and a time axis extends in the vertical direction as in TV program pages of newspapers etc. or vice versa. A program table that is displayed being superimposed on TV phone video being displayed on the screen 7 is a mini-program table, which is a small program table which is restricted in the number of channels and the total length of time slots. Program table data generated by the program table generator 39 is displayed on the screen 7 of the display device 27 via the GUI processor 38, the superimposition processor 25, and the video processor 26.

Next, the configuration of the video telephone apparatus 18 will be described. A line controller 41 is connected to a circuit network 42 such as an ISDN (Integrated Services Digital Network), and performs a transmission control on various signals that are exchanged with the circuit network 42. The line controller 41 is connected to the circuit network 42 via a line terminal 41*a*.

A network interface 43 is connected to a network 44 such as the Internet or a dedicated line. When the network interface 43 is used, the video telephone apparatus 18 takes the form of an IP (Internet protocol) telephone. The network interface 43 is connected to the network 44 via a network terminal 43*a*.

The video telephone apparatus 18 may be connected to either one or both of the circuit network 42 and the network 44. Where the video telephone apparatus 18 is connected to both of the circuit network 42 and the network 44, when the connection to one of the circuit network 42 and the network 44 is effective the controller 30 makes the connection to the other ineffective.

The video/audio controller 45 has a codec function of compressing/expanding a TV phone video signal and audio signal that are supplied from the line controller 41 or the network interface 43, and supplies the codec-subjected video signal and audio signal to the superimposition processor 25 and the audio processor 28, respectively. Furthermore, the video/audio controller 45 converts a video signal and an audio signal that are received from a camera video processor 46 and a microphone audio processor 47, respectively, into data to be sent to the circuit network 42 or the network 44.

The camera video processor 46 encodes a video signal received from the camera 10 and supplies a resulting video signal to the superimposition processor 25 or the video/audio controller 45 via the bus 29.

The microphone audio processor 47 encodes an audio signal received from the microphone 12 and supplies a resulting audio signal to the audio processor 28 or the video/audio controller 45 via the bus 29. Incorporating a wireless controller, the microphone audio processor 47 can receive and encode an audio signal that is sent from the wireless microphone 66.

When the video telephone apparatus 18 has received a termination call, the controller 30 displays an icon for notification of the reception of the termination call on the screen 7. If the user off-hooks the video telephone apparatus 18 (i.e., connects it to the telephone circuit), the controller 30 suspends the display of a broadcast program on the screen 7 and makes switching to display of video of the video telephone apparatus 18. If the user on-hooks the video telephone apparatus (i.e., disconnects it from the telephone circuit), the controller 30 finishes displaying the video of the video telephone apparatus 18 on the screen 7 and makes switching to display of a program on the last channel of the broadcast receiver 17.

The controller 30 also functions as a mini-program table automatic display setting module 40. The mini-program table automatic display setting module 40 has a function of setting whether to display a mini-program table such that it is superimposed on TV phone video being displayed on the screen 7. The mini-program table automatic display setting module 40 also has a function of setting the number of channels and a total length of time slots of a mini-program table. Setting items relating to the display of a mini-program table during a video telephone operation are included in various setting items of the digital broadcast receiver 1, and can be set by displaying the various setting items prepared in the digital broadcast receiver 1 by pressing a menu button 57 of the remote controller 14 and then selecting an item "mini-program table automatic display setting."

Figure 3:
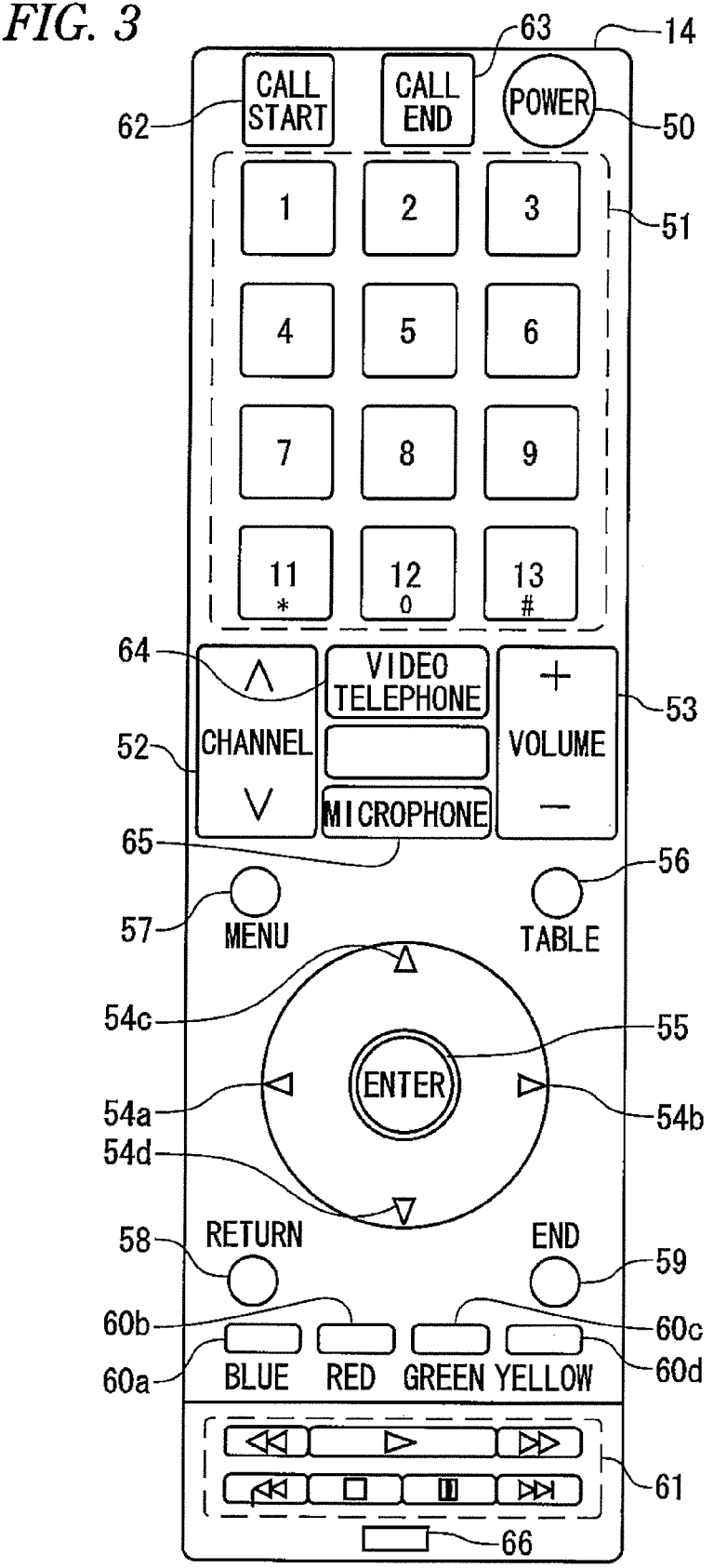
FIG. 3 illustrates an example remote controller.

FIG. 3 illustrates an example of the remote controller 14. The remote controller 14 sends a manipulation signal to the manipulation receiver 35 of the digital broadcast receiver 1 by a wireless communication using infrared light, Bluetooth, etc. A power button 50 is used for powering on or off the digital broadcast receiver 1. More specifically, the power button 50 is a button for switching the state of the digital broadcast receiver 1 from a standby state to an operation state or in the opposite way.

Channel selection buttons 51 are buttons that are assigned numbers 1 to 12 and are used for selecting a broadcast channel directly. In a video telephone operation, the channel selection buttons 51 function as dial buttons. A channel feed button 52 is a button for selecting a channel by increasing or decreasing the channel number in order. A volume adjustment button 53 is a button for adjusting the sound volume of a broadcast program or a TV phone call.

Cursor buttons 54 are buttons for moving the cursor or causing movement between selection buttons of various items in each of various information windows of a GUI picture displayed on the screen 7 of the display device 27. A leftward cursor button 54*a*, a rightward cursor button 54*b*, an upward cursor button 54*c*, and downward cursor button 54*d* are used for moving the cursor leftward, rightward, upward, or downward, respectively. An enter button 55 is used for causing execution of an operation corresponding to a destination position or button selected by the cursor buttons 54.

A program table button 56 is a manipulation button which is manipulated to display a program table on the screen 7. A menu button 57 is pressed to display various setting items prepared in the digital broadcast receiver 1. The user selects a target setting item from layer-displayed items.

A return button 58 is used to return to a one-manipulation-step-prior picture. An end button 59 is manipulated to finish a series of manipulations.

Four color buttons, that is, a blue button 60*a*, a red button 60*b*, a green button 60*c*, and a yellow button 60*d*, are arranged left to right in this order. They are used when items discriminated from each other by colors or selection items using colors are displayed on the screen 7. Recording device manipulation buttons 61 are buttons for causing a playback, a stop, a pause, fast feed, fast rewind, a skip to the next program, a return to the head, and a skip to the preceding program in reproducing programs recorded in the recording device 24.

A call start button 62 is an off-hook button for making a connection to the telephone circuit to initiate or receive a TV phone call. A call end button 63 is an on-hook button for disconnecting the telephone circuit to finish a TV phone call.

A video telephone button 64 is manipulated to switch the remote controller 14 so that it will serve as a remote controller for video telephone. A microphone button 65 is pressed to use the microphone 66. The microphone 66 is a wireless microphone, and an audio signal that is sent from the remote controller 14 is received and encoded by the wireless controller of the microphone audio processor 47.

Figure 4:
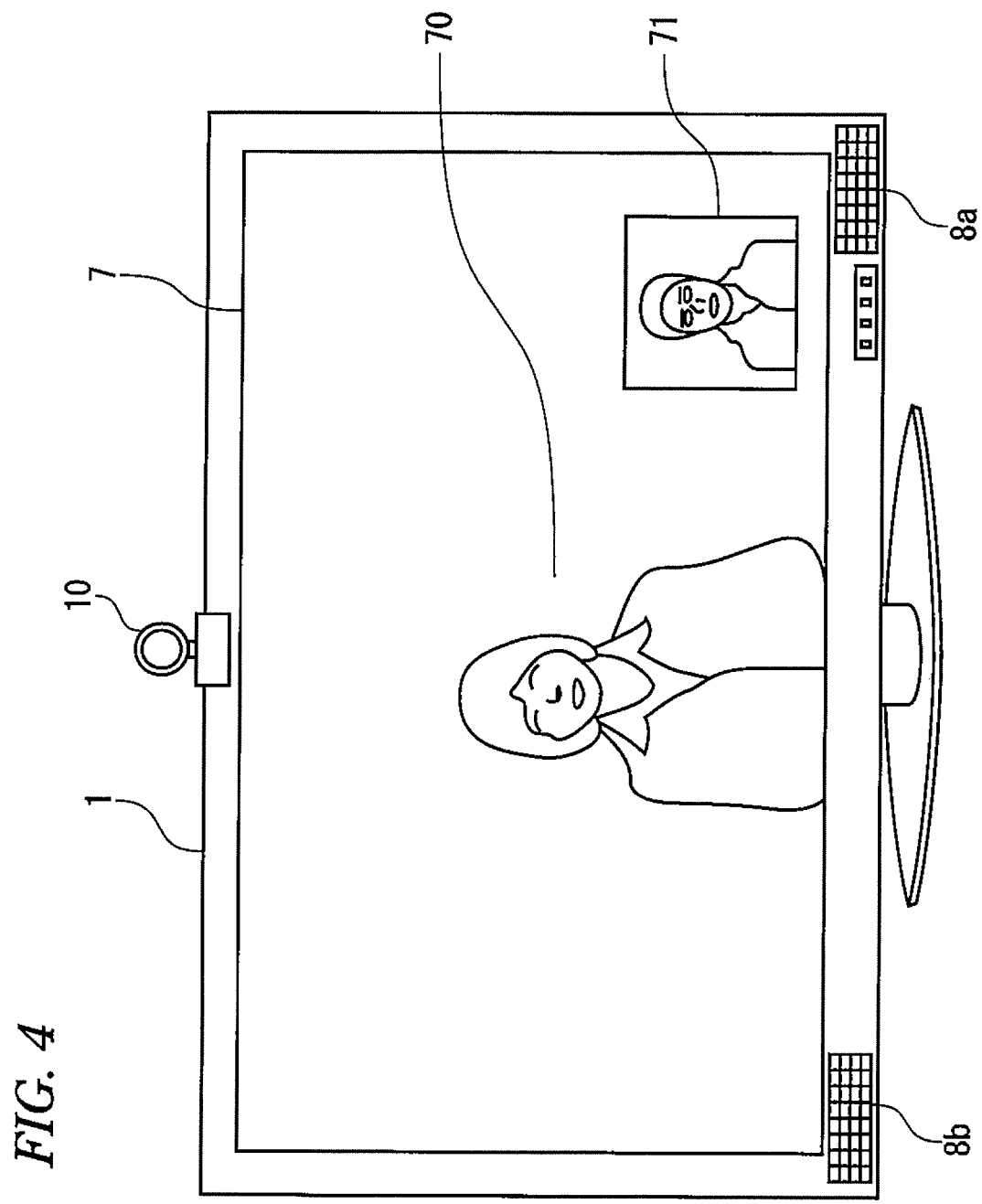
FIG. 4 illustrates a TV phone picture.

FIG. 4 illustrates a TV phone picture. When the digital broadcast receiver 1 receives a termination call and the user off-hooks the video telephone apparatus 18, that is, presses the call start button 62 of the remote controller 14, TV phone video 70 that is transmitted from a TV phone call partner apparatus to the video telephone apparatus 18 is displayed on the screen 7 and camera video 71 taken by the user-side camera 10 is also displayed on the screen 7 at a corner. A voice of the partner is output from the speakers 8a and 8b. If the digital broadcast receiver 1 receives a termination call while the user is viewing a broadcast program and the user off-hooks the video telephone apparatus 18, the display of the screen 7 is switched from the display of the broadcast program to display of a TV phone display.

Figure 5:
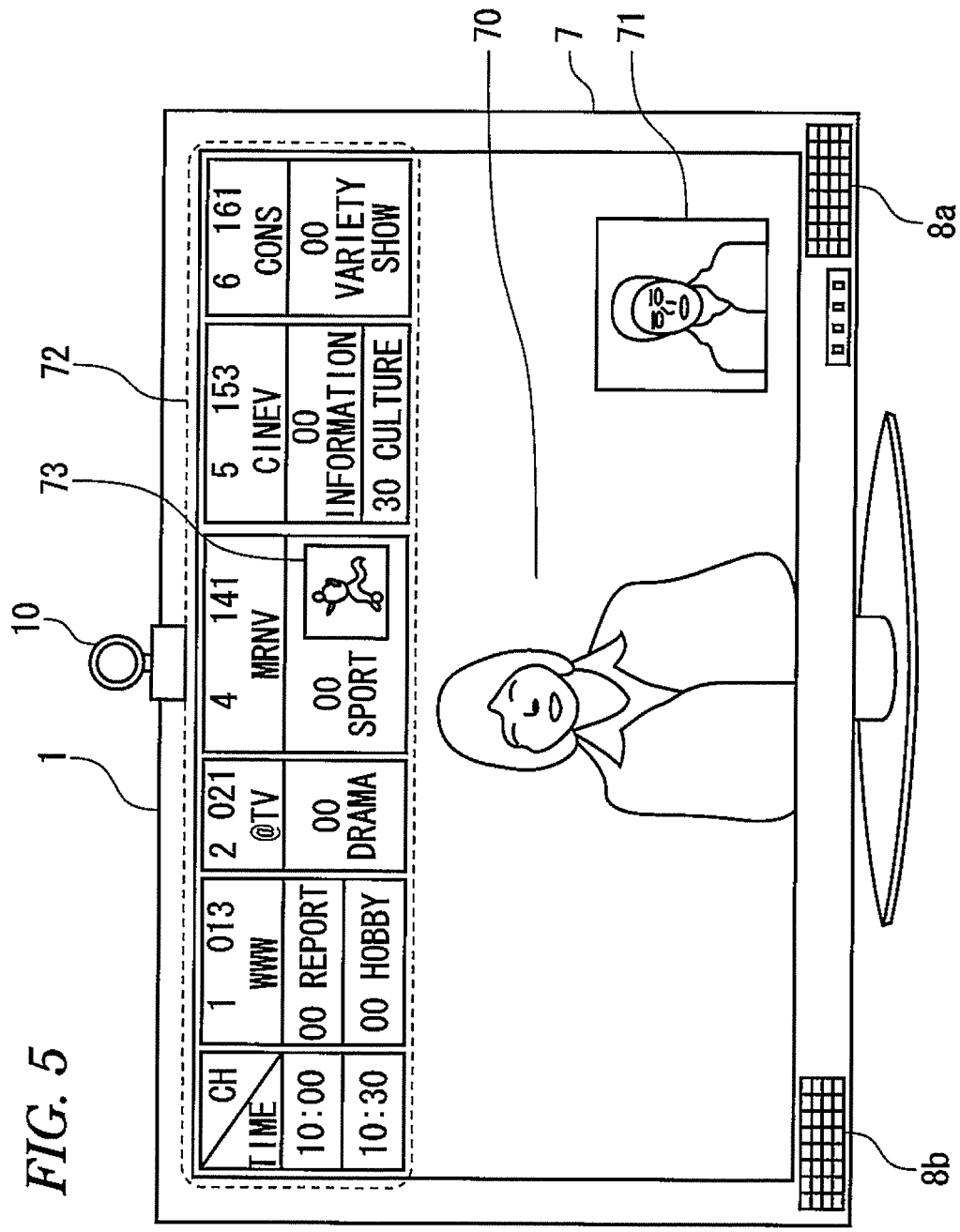
FIG. 5 illustrates a picture displayed on the screen in which a mini-program table is superimposed on TV phone video being transmitted to a video telephone apparatus.

FIG. 5 illustrates a picture displayed on the screen 7 in which a mini-program table 72 is superimposed on TV phone video 70 being transmitted to the video telephone apparatus 18. Where mini-program table automatic display during a video telephone operation is set on, after the video telephone apparatus 18 has been off-hooked and TV phone video 70 transmitted to the video telephone apparatus 18 has been displayed on the screen 7, a mini-program table 72 is displayed so as to be superimposed on the video 70 at a first predetermined time that comes after the off-hooking.

Figure 6:
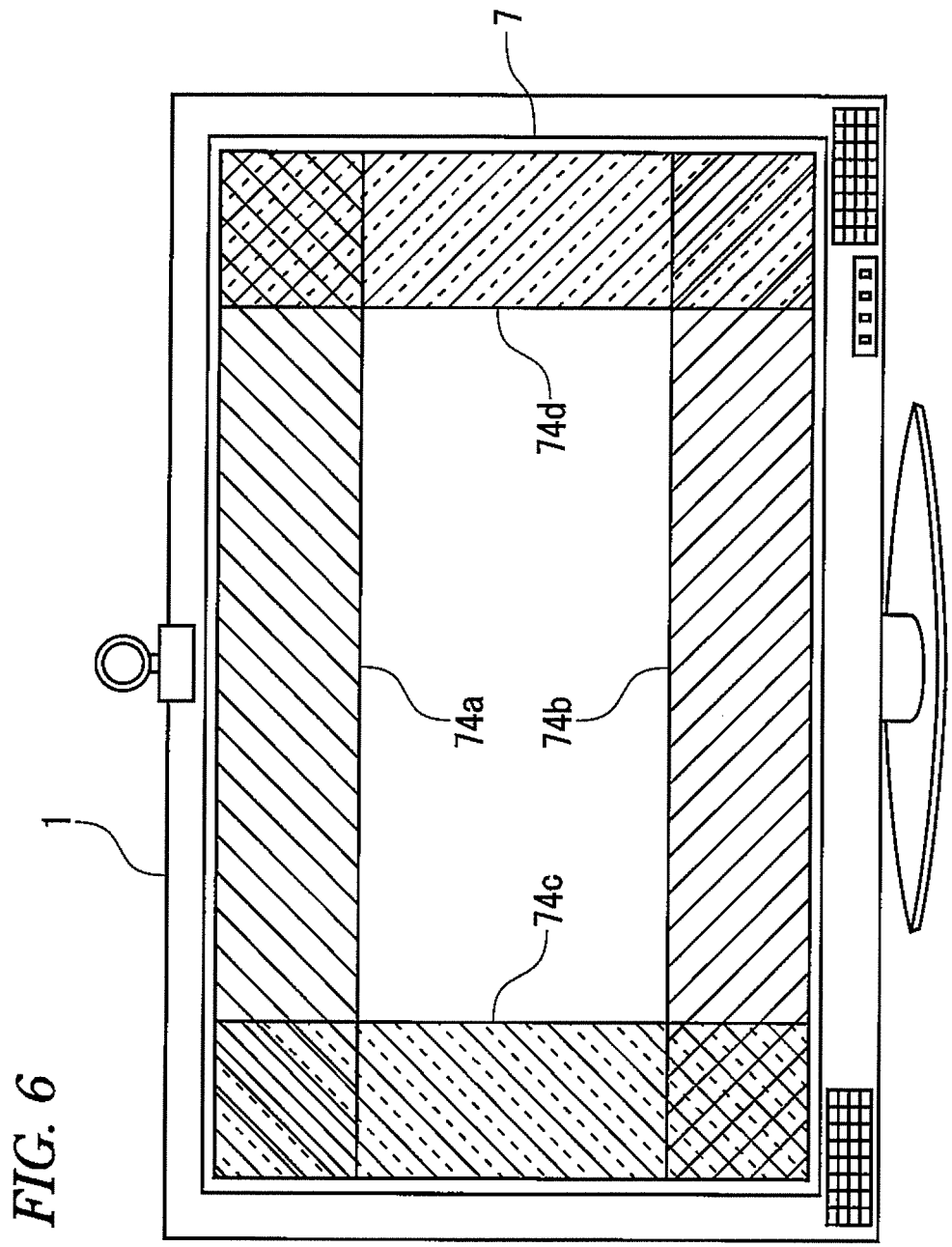
FIG. 6 illustrates display areas of the mini-program table on the screen.

FIG. 6 illustrates display areas of the mini-program table 72 on the screen. A mini-program table 72 is displayed in areas 74a, 74b, 74c, or 74d that are adjacent to the top end line, the bottom end line, the left end line, and the right end line of the screen 7, respectively. TV phone video 70, which is a main display item, occupies a central area of the screen 7 and the mini-program table 72 occupies a peripheral area. In the example of FIG. 5, the mini-program table 72 is displayed adjacent to the top end line of the screen 7.

The first predetermined time is a first-coming exact time at which program switching tends to occur, such as the hour or 30 minutes past the hour. For example, if on-hooking occurs at AM 9:50, AM 10:00 is the first exact time when program switching tends to occur. If on-hooking occurs at AM 10:20, AM 10:30 is the first exact time when program switching tends to occur. More strictly, a mini-program table 72 is displayed on the screen 7 after a lapse of several seconds or several tens of seconds before the first predetermined time.

Channels shown in the mini-program table 72 are several channels including a channel (last channel) a program on which was being viewed when the user off-hooked the video telephone apparatus 18. In the example of FIG. 5, the last channel is channel 4 and two channels on each side of the last channel are shown (five channels in total). The number of channels shown may be determined as appropriate according to the size of the screen 7. Or the digital broadcast receiver 1 may be configured so that the number of channels shown can be set by a user.

The total length of time slots shown in the mini-program table 72 is about 30 minutes to 2 hours. This is a relatively short time because the mini-program table 72 is displayed so as to occupy a peripheral area of the screen 7. In the example of FIG. 5, the total length of time slots is 1 hour (from 10:00 to 11:00). The total length of time slots may be determined as appropriate according to the size of the screen 7. Or the digital broadcast receiver 1 may be configured so that the total length of time slots shown can be set by a user.

The mini-program table 72 is displayed on the screen 7 of the display device 27 such that program table data is generated by the program table generator 39, converted into data having a program table form by the GUI processor 38, and supplied to the display device 27 via the superimposition processor 25 and the video processor 26.

The above measure prevents the user from being devoted to a TV phone conversation without caring about passage of time, and can thereby lower the probability of occurrence of an event that the user misses a program he or she wants to view.

In the example of FIG. 5, when the mini-program table 72 is displayed on the screen 7, the last channel is highlighted and text information and thumbnail video 73 are displayed for this channel.

Figure 7:
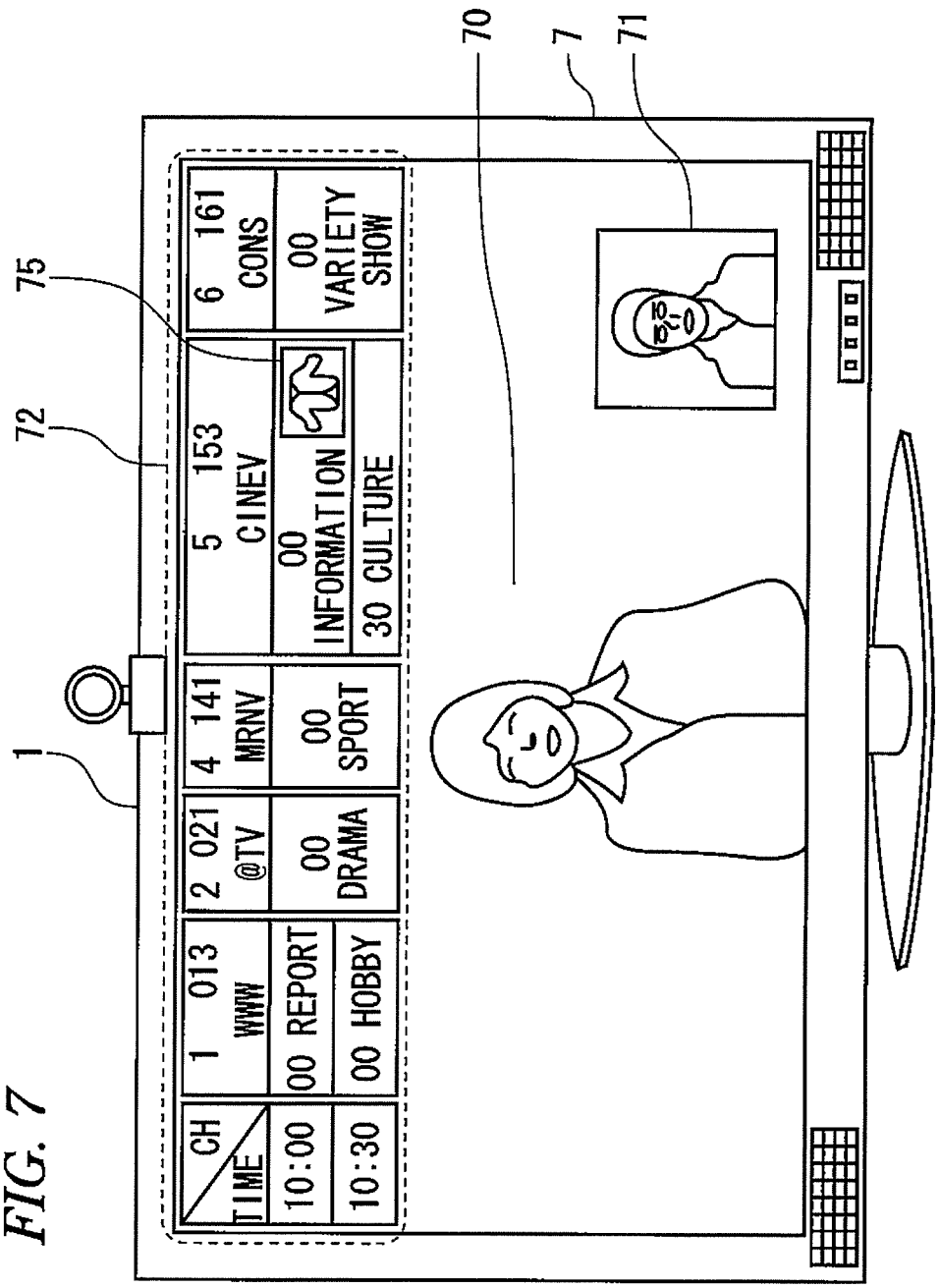
FIG. 7 illustrates a state that occurs when a rightward cursor button is pressed once in the state of FIG. 5.

FIG. 7 illustrates a state that occurs when the rightward cursor button 54b is pressed once in the state of FIG. 5. Since the rightward cursor button 54b has been pressed once, the channel (channel 5) that is located one channel on the right of the last channel is highlighted. Thumbnail video 75 of a program on the highlighted channel is displayed.

Figure 8:
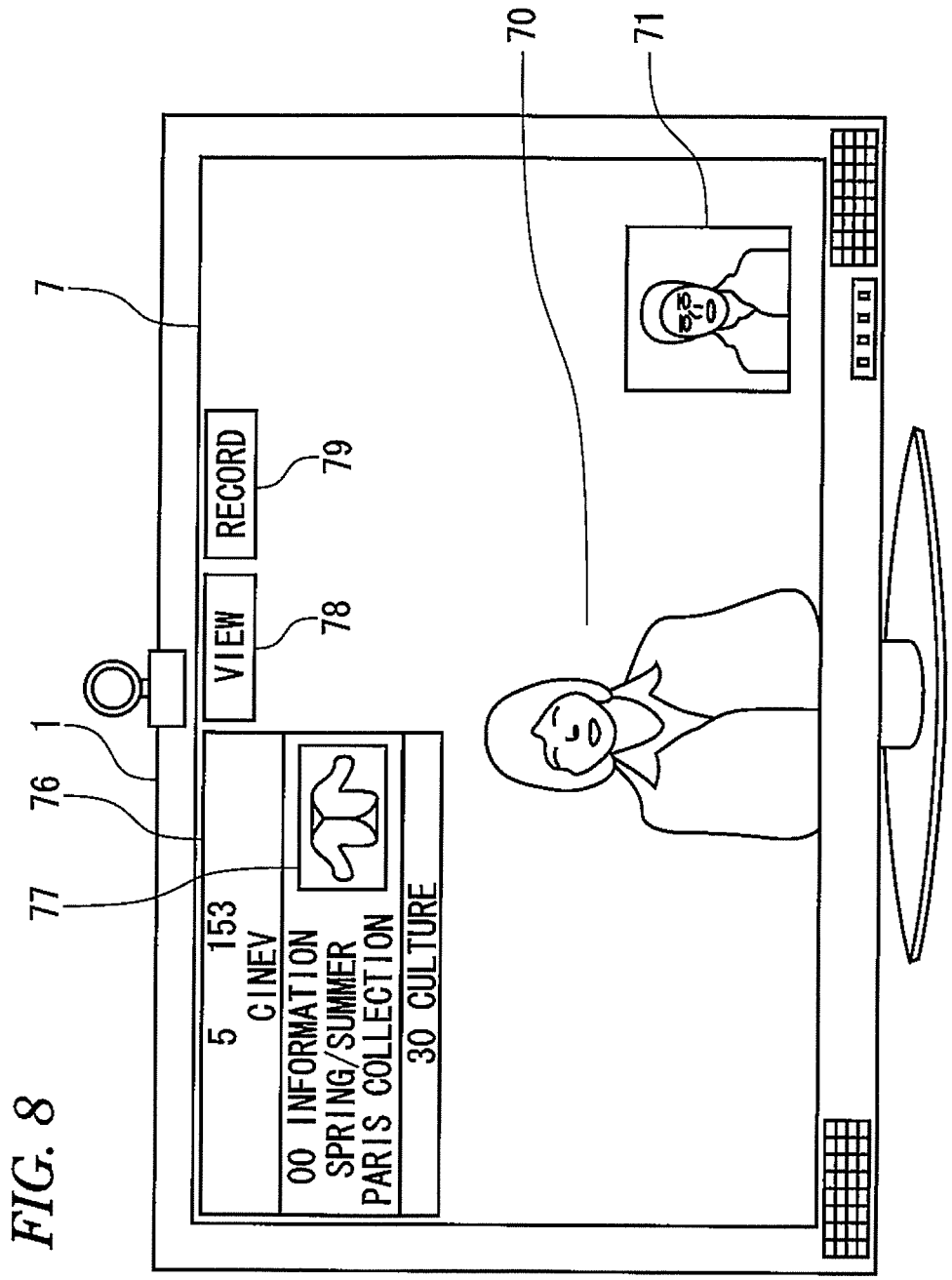
FIG. 8 illustrates a state that a selected channel window is displayed on the screen.

FIG. 8 illustrates a state that a selected channel window 76 is displayed on the screen 7. If the user selects one channel number shown in a mini-program table 72 using the cursor buttons 54 and presses the enter button 55, a selected channel window 76 is displayed. The one selected channel number, text information, and thumbnail video 77 are displayed in the selected channel window 76. A view button 78 and a record button 79 are displayed near the selected channel window 76.

The view button 78 is a button to be manipulated to finish the TV phone call and display the program on the channel that is shown in the selected channel window 76. The record button 79 is a button to be manipulated to record, in the recording device 24, the program on the channel that is shown in the selected channel window 76 without finishing the TV phone call.

Figure 9:
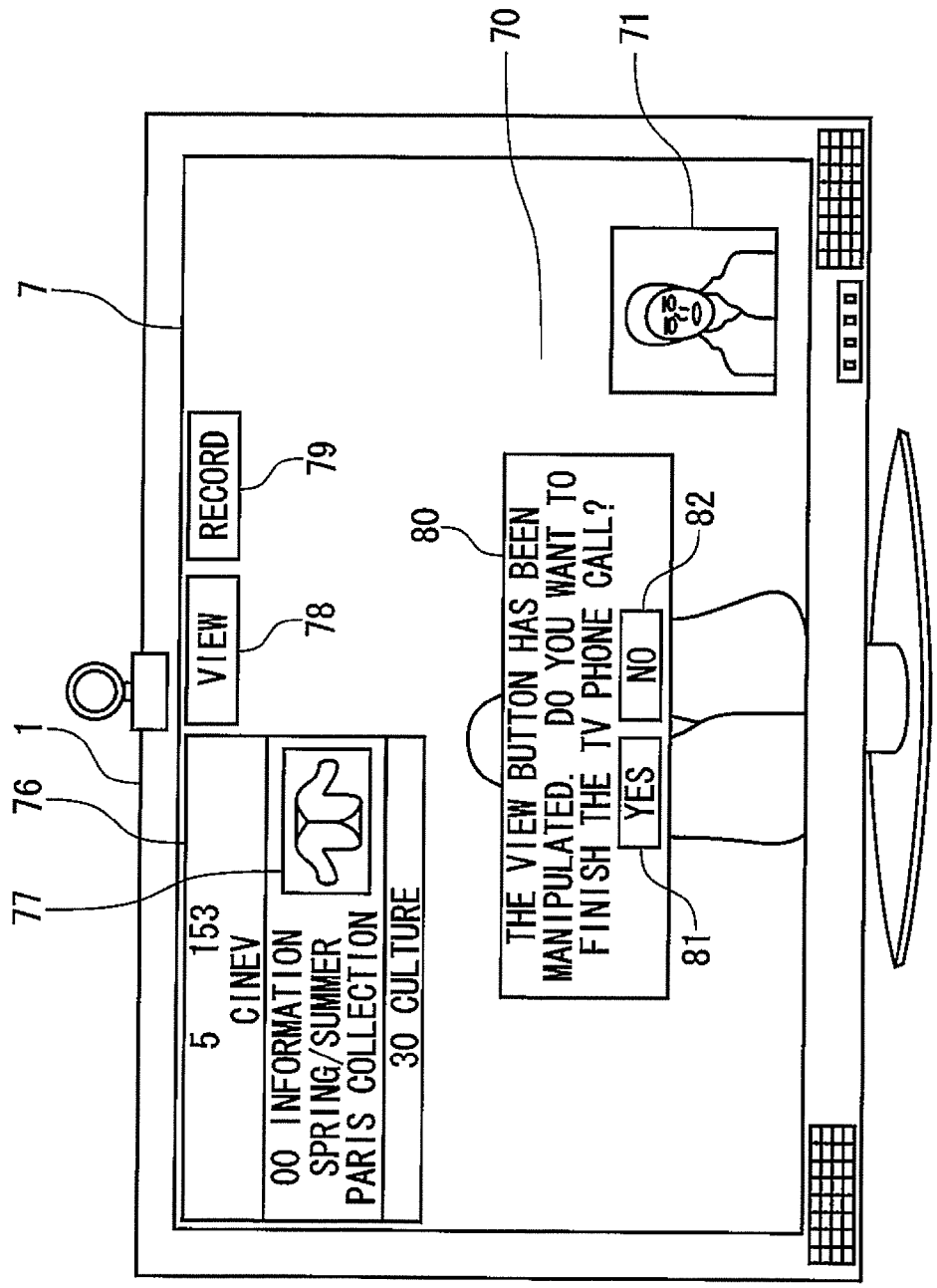
FIG. 9 illustrates a state that a TV phone call end confirmation window is displayed on the screen.

FIG. 9 illustrates a state that a TV phone call end confirmation window 80 is displayed on the screen 7. If the user selects the view button 78 by manipulating the cursor buttons 54 of the remote controller 14 and presses the enter button 55 of the remote controller 14, a TV phone call end confirmation window 80 is displayed to have the user confirm finishing of the TV phone call.

If the user selects a yes button 81 and presses the enter button 55 of the remote controller 14, the video telephone apparatus 18 is on-hooked, the TV phone call is finished, and the broadcast program on the channel shown in the selected channel window 76 is displayed for viewing. If the user selects a no button 82 and presses the enter button 55, the selected channel window 76 and the TV phone call end confirmation window 80 are closed and the TV phone call is continued.

Figure 10:
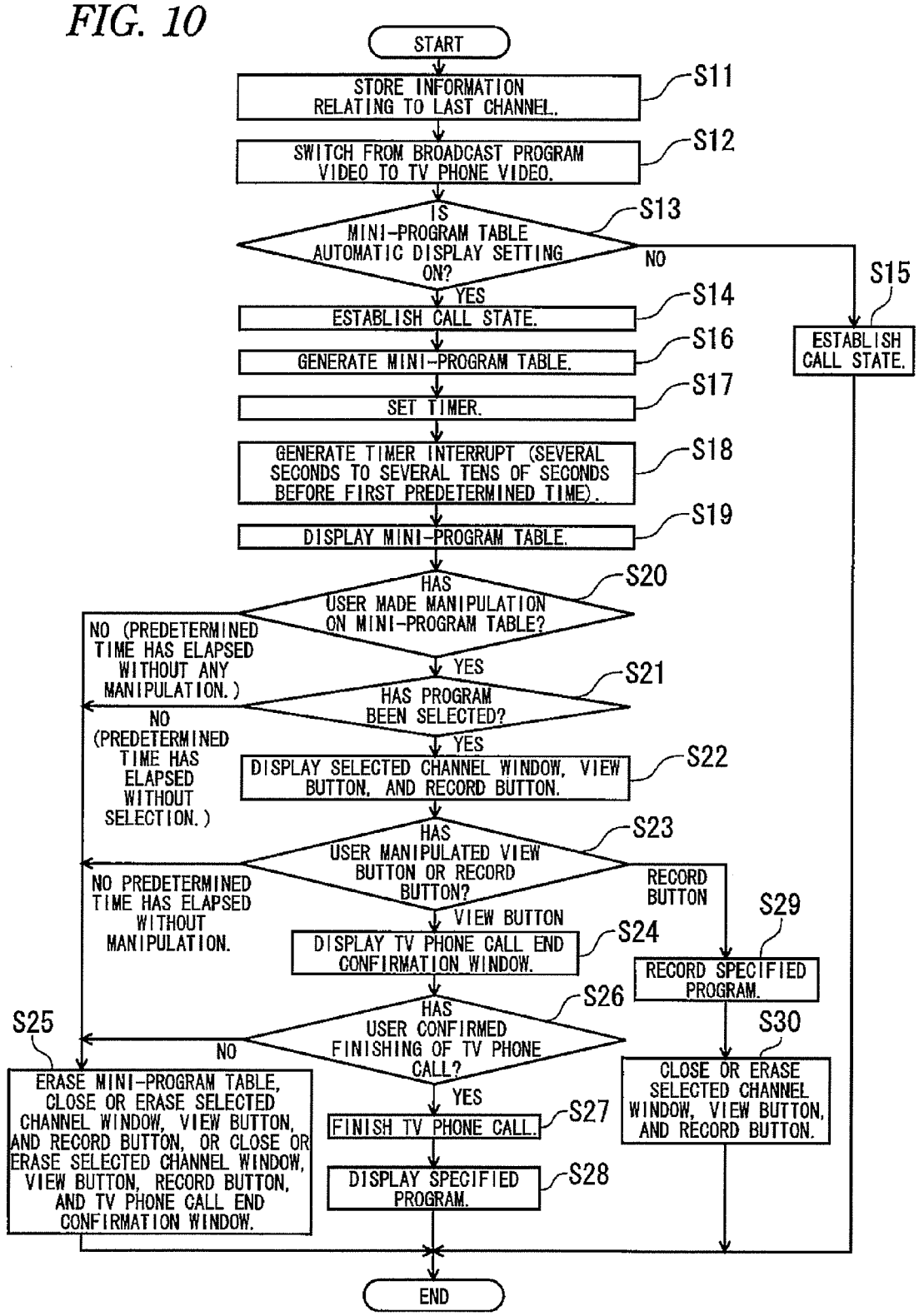
FIG. 10 illustrates a mini-program table automatic display process.

FIG. 10 illustrates a mini-program table automatic display process which is executed in association with a video telephone operation. The mini-program table automatic display process is started when the user off-hooks the video telephone apparatus 18 to make a TV phone originating call or receive a TV phone termination call.

At step S11, the controller 30 store information relating to the last channel in the RAM 32. At step S12, the controller 30 switches the display of the screen 7 from display of a broadcast program to display of TV phone video. At step S13, the controller 30 judges whether or not the mini-program table automatic display setting is on, that is, whether or not the setting of displaying a mini-program table such that it is superimposed on TV phone video being displayed on the screen 7 is made on by the mini-program table automatic display setting module 40. If the mini-program table automatic display setting is on, the process moves to step S14. If not, the process moves to step S15, where a TV phone call state is established. Then, the process is finished.

At step S14, the controller 30 establishes a TV phone call state. At step S16, the program table generator 39 generates data of a mini-program table and the GUI processor 38 generates a mini-program table. At step S17, the controller 30 sets a timer that is provided in the controller 30.

At step S18, the controller 30 generates a timer interrupt. This is done after the video telephone apparatus 18 has been off-hooked and video transmitted to the video telephone apparatus 18 has been displayed on the screen 7. More specifically, this is done several seconds to several tens of seconds before a first predetermined time (a first-coming exact time at which program switching tends to occur, such as the hour or 30 minutes past the hour) that comes after the off-hooking. At step S19, the controller 30 displays a mini-program table 72 on the screen 7 of the display device 27 via the superimposition processor 25 and the video processor 26.

At step S20, the controller 30 judges whether or not the user has made a manipulation on the displayed mini-program table 72. If the user has made a manipulation on the displayed mini-program table 72, the process moves to step S21. If the user has made no manipulation on the displayed mini-program table 72 for a predetermined time, the process moves to step S25, where the controller 30 erases the mini-program table 72. Then, the process is finished. The predetermined time is about 30 seconds, for example. At step S21, the controller 30 judges whether or not a program shown in the mini-program table 72 has been selected. If a program shown in the mini-program table 72 has been selected, the process moves to step S22. If no program shown in the mini-program table 72 has been selected for a predetermined time, the process moves to step S25. The predetermined time is about 30 seconds, for example.

At step S22, the controller 30 displays a selected channel window 76, a view button 78, and a record button 79. At step S23, the controller 30 judges whether or not the user has manipulated the view button 78 or the record button 79. If the view button 78 has been manipulated, the process moves to step S24. If the record button has been manipulated, the process moves to step S29. If the user has made no manipulation for a predetermined time, the process moves to step S25, where the controller 30 closes or erases the selected channel window 76, the view button 78, and the record button 79. Then, the process is finished. The predetermined time is about 30 seconds, for example.

At step S24, the controller 30 displays a TV phone call end confirmation window 80 on the screen 7. At step S29, the recording setting module 37 starts recording of the specified program. At step S30, the controller 30 closes or erases the controller 30 closes or erases the selected channel window 76, the view button 78, and the record button 79. Then, the process is finished.

At step S26, the controller 30 judges whether or not the user has confirmed finishing of the TV phone call. If it is judged that the user has confirmed finishing of the TV phone call, the process moves to step S27. If it is judged that the user has not confirmed finishing of the TV phone call, the process moves to step S25, where the controller 30 closes or erases the selected channel window 76, the view button 78, the record button 79, and the TV phone call end confirmation window 80. Then, the process is finished.

At step S27, the controller 30 finishes the TV phone call and establishes an on-hook state. At step S28, the controller 30 displays the specified program to start viewing. Then, the process is finished.

As described above, after the video telephone apparatus 18 has been off-hooked and TV phone video transmitted to the video telephone apparatus 18 has been displayed on the screen 7, a mini-program table is displayed so as to be superimposed on the TV phone video at a first predetermined time that comes after the off-hooking. This prevents the user from being devoted to a TV phone conversation without caring about passage of time, and can thereby lower the probability of occurrence of an event that the user misses a program he or she wants to view.

The invention is not limited to the above embodiment itself. For example, constituent elements may be modified without departing from the spirit and scope of the invention. Further, plural constituent elements disclosed in the embodiment may be combined, and several ones of the constituent elements of the embodiment may be omitted.

The invention claimed is:

1. A digital broadcast receiver, comprising:
    a video telephone module configured to establish a video telephone communication with an external apparatus through a communication network and to receive a video telephone image from the external apparatus during the video telephone communication, the video telephone image being displayed on a screen during the video telephone communication;
    a program table generator configured to generate a program table of broadcast programs; and
    a display control module configured to control a display on the screen such that the program table is automatically superimposed on the video telephone image during the video telephone communication.

2. The digital broadcast receiver of claim 1
    wherein the display control module controls the display so that the program table is displayed on the screen at
        an area adjacent to a top end line,
        an area adjacent to a bottom end line,
        an area adjacent to a left end line, or
        an area adjacent to a right end line.

3. The digital broadcast receiver of claim 1
    wherein the display control module controls the display so that the program table is automatically superimposed on the video telephone image for a predetermined time period after the video telephone communication is established.

4. The digital broadcast receiver of claim 1
    wherein the program table includes:
        a channel number of a broadcast program which was viewed immediately before an establishment of the video telephone communication at a substantially center portion; and
        one or more other channel numbers at a side of the last-viewed channel number.

5. The digital broadcast receiver of claim 1 wherein the program table is displayed when a predetermined clock time occurs.

6. The digital broadcast receiver of claim 1, further comprising:
a module configured to receive the user's manipulation to perform a recording of at least one broadcast program within the program table even during the video telephone communication wherein, if the recording is chosen during the video telephone communication, the recording is performed while continuing the video telephone communication.

7. The digital broadcast receiver of claim 1, further comprising:
a module configured to receive the user's manipulation to perform a program display of at least one broadcast program within the program table, wherein, if the program display is chosen during the video telephone communication, the program display is performed while terminating the video telephone communication.

8. The digital broadcast receiver of claim 1, further comprising:
a setting module configured to display a setting screen which allows the user to set whether or not the program table should be superimposed on the video telephone image for a predetermined time period after an establish the video telephone communication.

9. A digital broadcast receiver, comprising:
a video telephone module configured to establish a video telephone communication with an external apparatus and to receive a video telephone image from the external apparatus during the video telephone communication, the video telephone image being displayed on a screen during the video telephone communication;
a program table generator configured to generate a program table of broadcast programs; and
a display control module configured to control a display on the screen where the program table is automatically superimposed on the video telephone image during the video telephone communication.

10. The digital broadcast receiver of claim 9 wherein the display control module controls the display so that the program table is displayed on the screen at (i) an area adjacent to a top end line, (ii) an area adjacent to a bottom end line, (iii) an area adjacent to a left end line, or (iv) an area adjacent to a right end line.

11. The digital broadcast receiver of claim 9 wherein the display control module controls the display so that the program table is automatically superimposed on the video telephone image for a predetermined time period after the video telephone communication is established.

12. The digital broadcast receiver of claim 9 further comprising:
a module configured to receive an input to perform a recording of at least one broadcast program within the program table even during the video telephone communication wherein, if the recording is chosen during the video telephone communication, the recording is performed while continuing the video telephone communication.

13. The digital broadcast receiver of claim 9 further comprising:
a module configured to receive input to perform a program display of at least one broadcast program within the program table wherein, if the program display is chosen during the video telephone communication, the program display is performed while terminating the video telephone communication.

* * * * *